United States Patent Office 2,767,747
Patented Oct. 23, 1956

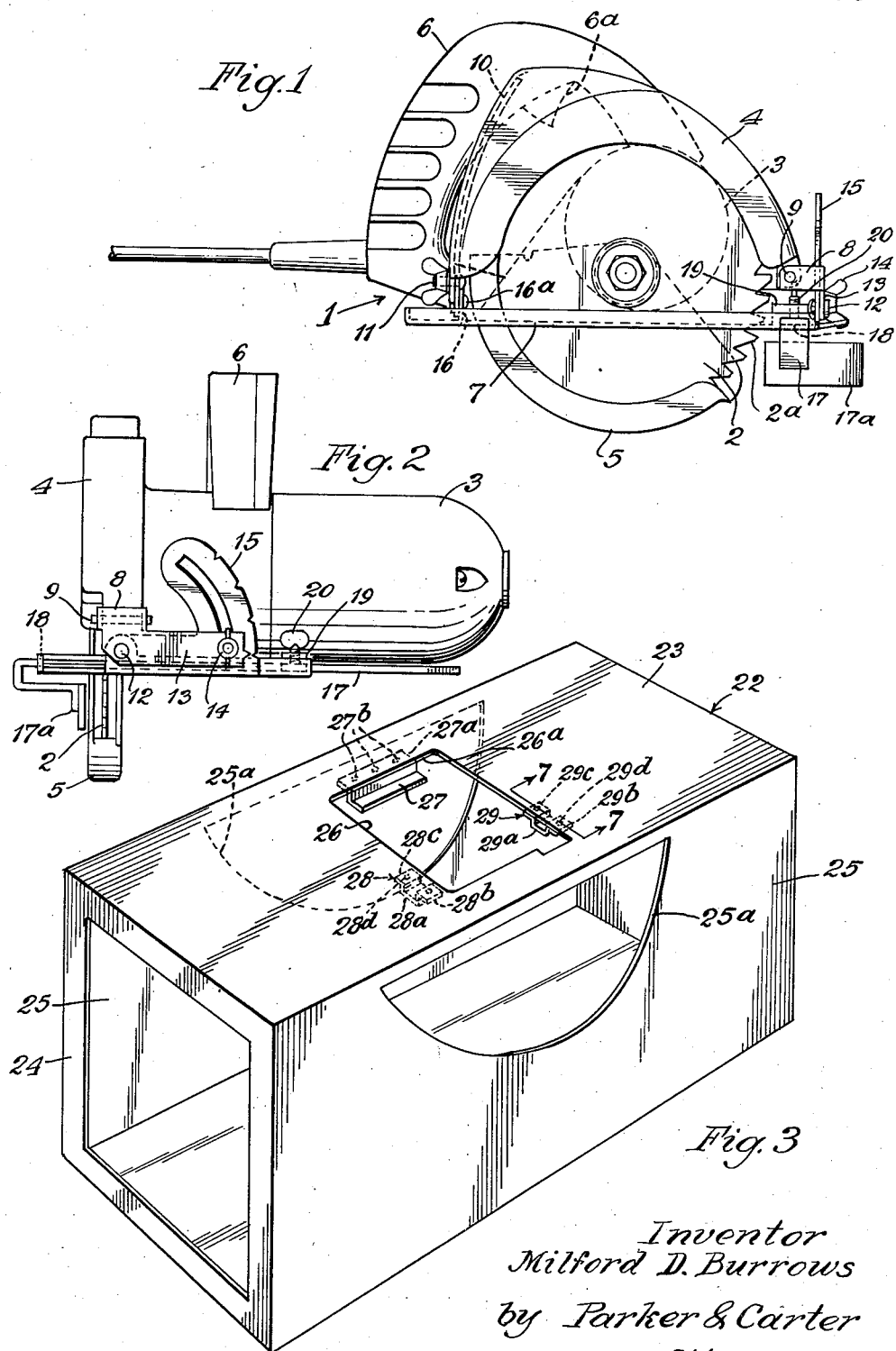

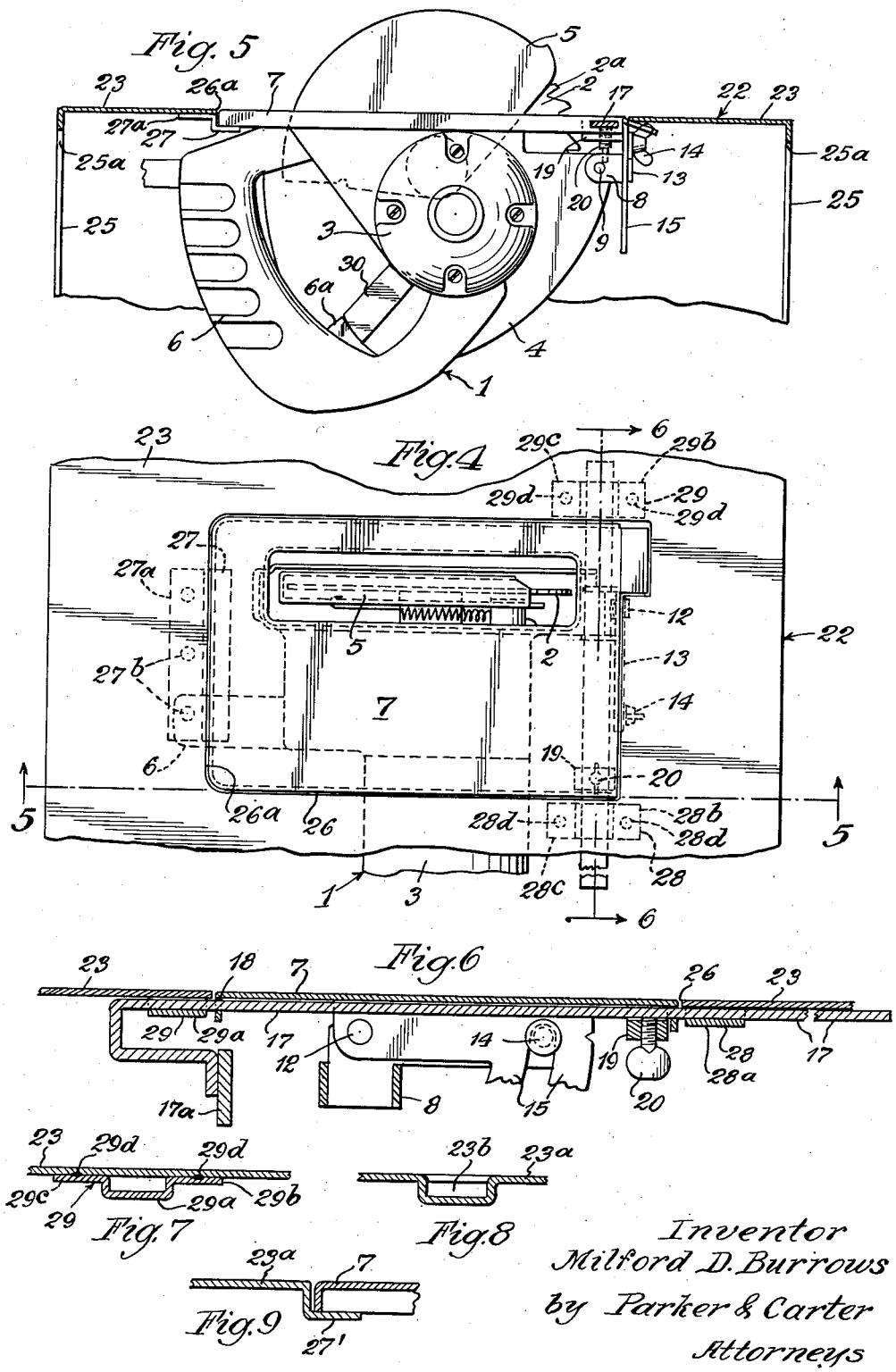

2,767,747

CONVERSION UNIT FOR PORTABLE SAW

Milford D. Burrows, Chicago, Ill., assignor to Pioneer Gen-E-Motor Corporation, Chicago, Ill., a corporation of Delaware Application May 14, 1953, Serial No. 354,969

3 Claims. (Cl. 143—132)

This invention relates to a conversion unit for a conventional type of portable circular saw.

There are many known forms of portable circular saws. Most commercial forms of these saws are equipped with a base attached to the saw in a manner such that the depth of cut of the saw blade may be adjusted, as well as the angle of the cut of the saw blade. Their portability enables the operator of the saw to perform a wide variety of cutting tasks and their use requires the operator to manually move the saw during a cutting stroke, as distinguished from a relatively stationary circular saw unit where the work is moved relative to the saw unit while a cutting stroke is made on the work. A portable saw is adapted for a wide variety of successive cuts on pieces of work, while a stationary circular saw is adapted primarily for the same type of cut on a relatively large number of pieces of work.

I propose to employ a conversion unit for a conventional portable-type, power-driven saw, wherein, by a rather simple attachment, the portable saw is made over or converted into a bench-type, or relatively fixed power-driven circular saw. The operator of the equipment thus has the advantages of both a portable-type power-driven circular saw and bench-type power-driven circular saw with only a single power-driven circular saw unit.

One object of this invention is the provision of a conversion unit for making a portable circular saw into a bench-type circular saw by utilizing, in a large degree, only the conventional elements found in a conventional portable circular saw.

Another object of this invention is the provision of a conversion unit for a portable circular saw which may be utilized with a minimum number of operator manipulations.

Another object of this invention is the provision of a work-supporting table for a circular saw which utilizes, as a portion thereof, the base of a conventional portable circular saw.

Another object of this invention is to provide a simple means of fastening the base of a portable circular saw to the base of a work-supporting table by means of a simple connection between the platform and base, while, at the same time, positively holding the power unit and saw firmly in position.

Other objects will appear from time to time in the course of the ensuing specification and claims.

Referring generally now to the drawings:

Fig. 1 is a side view of a portable-type power-driven saw which is utilized in the invention;

Fig. 2 is an end view of Fig. 1;

Fig. 3 is a perspective view of the work-supporting platform of the invention in assembled position for the portable saw of Fig. 1;

Fig. 4 is a partial plan view of the work-supporting platform and power saw shown in Fig. 2;

Fig. 5 is a sectional view of the device shown in Fig. 4 taken along the section lines 5—5 of Fig. 4;

Fig. 6 is another sectional view taken along the section lines 6—6 of the device shown in Fig. 4;

Fig. 7 is a sectional view of one of the details of construction employed in my invention taken along the lines 7—7 of Fig. 3;

Fig. 8 is a sectional view of a different embodiment of that shown in Fig. 7; and Fig. 9 is another embodiment of a portion of the device shown in Fig. 5.

Referring specifically now to the drawings, wherein like elements are designated by like characters throughout, and in the first instance to Fig. 1, 1 designates a circular power-driven portable saw unit. The saw includes a circular blade 2 driven by a motor 3. A guard member 4 surrounds approximately half of the cutting edges 2a of the saw blade and is formed integrally with the housing of the motor 3. A movable guard member 5 is mounted for movement about the axis of the saw blade and encloses the majority of the remainder of the saw blade. The movable guard 5 is swung upwardly within the guard 4 as the saw blade engages and moves through the work. A handle 6 is attached to the housing of the motor to provide for manipulation of the unit as a whole. As is customary in this form of saw, the handle is provided with a "trigger-type" switching member 6a for energizing and deenergizing the saw. A generally rectangular work-supporting, or unit-supporting, platform 7 is mounted on the saw unit to support the unit as it moves through the work. The base 7 has a generally rectangularly-shaped opening formed therein so that the saw blade 2 and guard 5 extend through the opening and into the work.

Base 7 is attached to the remainder of the unit so that the base may be moved through a variety of planes disposed parallel to the axis of the saw blade and also through a variety of planes inclined to the axis of the saw blade. In this way the depth of cut of this type of portable saw may be regulated and, also, the angle of cut of this type of saw may be regulated.

As shown in Figs. 1 and 2, a bracket member 8 is pivotally mounted on the saw unit proper, as by means of a pivot pin 9, disposed generally parallel to the axis of rotation of the saw blade. A generally arcuate element 10 is received within the guard member 4 and has a longitudinally extending slot formed therein for the reception of a setscrew 11. Bracket member 8 is pivotally connected to the base, as at 12, and has a laterally extending member 13 provided with a thumbscrew 14 received within an arcuate-extending member 15 joined to the base. Base 7 also carries a small bracket member 16 formed on the rear portion thereof which is pivotally connected to element 10, as at 16a. By loosening the setscrew 14, the base may be swung about pivots 12 and 16a to adjust the angle of the base with respect to the plane of the saw blade. When the proper angle is obtained, thumbscrew or setscrew 14 is then tightened and the base is held in this position relative to the blade 2. The depth of cut of the saw blade is adjusted by loosening the thumbscrew or setscrew 11 and moving the base about pivot 9 as an axis. After reaching the desired position of the base with respect to the saw blade to insure the proper depth of cut, thumbscrew 11 is tightened, thus securely holding the base 7 with respect to the saw blade 2 at the desired depth of cut of the saw blade. 17 indicates a rip guide which is carried by the base 7. The rip guide 17, having a work-engaging member 17a, is slidably mounted on the base 7 by means of a slot 18 formed on the base at one end thereof and a generally U-shaped bracket 19 formed integrally with the other end of the base, thus confining the rip guide 17 to sliding movement parallel to the axis of rotation of the saw blade. A setscrew 20 is carried by the bracket 19 and has one end portion bearing against the body of the rip guide for holding it against displacement within the guide 19.

Referring now to Fig. 3, 22 indicates a work-supporting table having a generally flat and extended work-supporting platform 23 on the upper portion thereof. The table 22 has one end portion 24 open and two side portions 25 cut away, as at 25a, for a purpose to be pointed out in ensuing portions of this specification. An opening 26, having the precise configuration of the work-supporting base 7 of the power saw shown in Fig. 1 is cut through the upper surface of the platform 23. The opening 26 conforms in size and configuration to the size and configuration of the base 7 of the power saw unit to preclude twisting of the unit in the plane of the base. A projection 27 extends into this opening on one side thereof at a distance slightly below the upper surface of the platform 23. At the opposite side of the opening 26 a pair of brackets 28 and 29 are secured. Brackets 28 and 29 have portions 28a and 29a spaced from the undersurface of the work-supporting platform 23. The projection 27 and brackets 28 and 29 are adapted to cooperate with elements on the portable power saw for holding it in position.

Projection 27 extends through a substantial portion of the width of the opening 26 and has a connecting portion 27a which is welded to the undersurface of the top wall 23, as at 27b. Each of the brackets 28 and 29 has connecting portions 28b, 28c and 29b, 29c which are welded to the undersurface of the top wall 23, as at 28d and 29d. Fig. 7 shows this arrangement.

Fig. 4 illustrates a plan view of the work platform and table shown in Fig. 3 with the power saw in position. As will be apparent in this figure, the base 7 of the power saw unit is inserted in the opening formed in the work platform 23 so that the upper surface of the base 7 is generally flush with the upper surface of the platform 23. The rear portion of the base rests upon the projection 27, while the forward portion of the base may be moved with relation to the rear portion. The projection 27 is adapted to extend between the handle 6 and base 7, as will be seen best in Fig. 5. In order to firmly hold the base 7 with relation to the platform 23, a locking member which, in this instance, may be the rip guide 17, is inserted through the brackets 28 and 29 and through the guide members 18 and 19 formed on the base of the power saw, as will be seen best in Fig. 5. After the locking member 17 is inserted, the setscrew 20 is tightened so as to firmly hold this member in position and against axial displacement with respect to the guide members and bracket members. The bracket members 28 and 29 have their lower surfaces spaced from the lower surface of the platform 23 a distance generally equal to the thickness of the locking member 17 so as to insure a snug fit. The bracket members, together with the lower surface of the worktable, define apertures of an area generally equal to the cross-sectional area of the rip guide 17 or locking member 17. Bracket members 28 and 29 are spaced from the rear edge 26a of the opening 26 a distance such that the defined apertures are spaced from the edge 26a a distance equal to the spacing of the apertures in the guides 18 and 19 from the rear surface of the base 7.

After positioning the saw unit in nested position in the worktable, a trigger block 30 may be inserted between the trigger or switching member 6a and the housing of the power unit to hold the trigger 6a in energized position. The power cable of the unit may be led out through any of the openings 25 or 25a and provided with an auxiliary switching means, if desired.

While not shown in the drawings, it will be apparent that, if desired, the table 22 may be provided with suitable gauges and the like for moving work into the cutting blade at a variety of angles as well as gauges for moving the work across the table in a manner providing for cuts at a predetermined distance from a reference portion of the work.

In Fig. 8 I illustrate an alternative method of forming the bracket members 28 and 29. In this figure the metal of the worktable or platform 23a is sheared along parallel lines transverse to the extension of the locking member 17 and the metal between these two sheared lines or cuts is then drawn downwardly a distance such as to define an aperture 23b of the proper size for the reception of the locking member 17.

Fig. 9 illustrates an alternative method of forming the supporting platform so as to provide a support for the base of the saw. In this figure the supporting projection 27' is formed integrally with the wall 23a by merely drawing the metal of the platform 23 into the desired configuration, as at 27'.

Whereas I have shown and described an operative device, I wish it to be understood that this showing is to be taken in a diagrammatic or illustrative sense only; that there are many modifications falling within the spirit of the invention which will be apparent to those skilled in the art. The scope of the invention, therefore, should be limited only by the scope of the hereinafter appended claims.

The use and operation of my invention are as follows:

I illustrate a conversion unit for a portable power saw, so that with a very simple and quick connection the portable power saw may be utilized as a bench-type power saw, thereby having the advantages of that type of saw.

When it is desired to utilize the power saw as a bench-type circular saw, the unit 1 is inserted through the opening 25 in the table 22 with the base of the unit 1 extending or facing upwardly. The rear portion of the base is slipped into position over the projection 27 which is spaced from the upper surface of the platform 23 a distance such as to insure that the surface of the base is coextensive or flush with the surface 23 of the table. The base of the saw is then moved upwardly to a position where the guides 18 and 19 on the base are aligned with the brackets 28 and 29 formed in the work platform 23. The locking member 17 is inserted through the guides 18 and 19 and brackets 28 and 29 to securely hold the unit in position with the base of the saw unit flush with the base or surface of the platform 23. After the locking member or rip guide 17 has been inserted, the setscrew 20, customarily employed with the power saw unit, may be tightened so as to hold the locking member 17 in position.

With the saw firmly held in cutting position, the depth of cut of the saw may be regulated by merely adjusting the power unit of the saw about the base 7 on the pivot 9 and appropriately setting the thumbscrew 11. In like manner, the angle of cut of the saw may be adjusted by swinging the saw blade and power unit about the pivots 12 and 16a as an axis and properly setting the setscrew 14. Thus, by a very simple connection, it is possible to convert a conventional portable power saw into a bench-type circular saw having the requisite advantages of adjustability of the depth of cut and adjustability of the angle of cut. Then, when the operator desires to utilize the saw unit as a portable power saw, he simply reaches through the opening 25a, loosens the setscrew 20, removes the rip guide or locking member 17 and removes the saw unit from its nested position in the opening 26 through the opening 25 in the table.

Thus, with a single power unit the operator has the advantages of both a portable saw and a bench-type saw.

I claim:

1. A supporting unit for converting a portable power saw having a movably mounted base thereon and a slidable rip guide attachment therefor into a bench type circular saw including a table having a relatively smooth and plane work-supporting platform at the upper portion thereof, said platform having an opening formed therein, said opening having a size and configuration conforming to the size and configuration of the base of a portable power saw, a supporting projection extending within said opening whereby, when said base is positioned in said opening, the rear end of said base rests upon said projection, and means for preventing vertical movement of the forward end of said base including means spaced beneath the platform whereby said rip guide is insertable between the under surface of said platform and said means.

2. A supporting unit as recited in claim 1 wherein said means for preventing vertical movement of the forward end of said base includes brackets welded to the undersurface of the platform.

3. A supporting unit as set forth in claim 1 wherein said means for preventing vertical movement of the forward end of said base includes brackets drawn from the original surface of the platform and extending beneath the platform.

References Cited in the file of this patent

UNITED STATES PATENTS

| | | |
|---|---|---|
| Re. 17,087 | Billingsley | Sept. 25, 1928 |
| 1,607,197 | Hatleli | Nov. 16, 1926 |
| 1,663,486 | Wertz | Mar. 20, 1928 |
| 1,799,215 | Colby | Apr. 7, 1931 |
| 1,801,721 | Caldwell | Apr. 21, 1931 |
| 1,848,330 | Emmons | Mar. 8, 1932 |
| 2,008,673 | Ocenasek | July 23, 1935 |